United States Patent
Zenz et al.

(10) Patent No.: US 7,954,087 B2
(45) Date of Patent: May 31, 2011

(54) TEMPLATE INTEGRATION

(75) Inventors: Ingo Zenz, Epfenbach (DE); Frank Kilian, Mannhein (DE); Krasimir P. Semerdzhiev, Sofia (BG)

(73) Assignee: SAP AG, Walldorf (DE)

( * ) Notice: Subject to any disclaimer, the term of this patent is extended or adjusted under 35 U.S.C. 154(b) by 1166 days.

(21) Appl. No.: 11/322,511

(22) Filed: Dec. 30, 2005

(65) Prior Publication Data

US 2007/0157172 A1   Jul. 5, 2007

(51) Int. Cl.
G06F 9/44 (2006.01)
(52) U.S. Cl. ............... 717/121; 717/120; 717/170
(58) Field of Classification Search ............ 717/121, 717/120, 170; 709/222
See application file for complete search history.

(56) References Cited

U.S. PATENT DOCUMENTS

| | | |
|---|---|---|
| 5,479,599 A | 12/1995 | Rockwell et al. |
| 5,608,865 A | 3/1997 | Midgely et al. |
| 5,758,154 A | 5/1998 | Qureshi |
| 5,832,503 A | 11/1998 | Malik et al. |
| 5,996,012 A | 11/1999 | Jarriel |
| 6,041,347 A | 3/2000 | Harsham et al. |
| 6,055,227 A | 4/2000 | Lennert et al. |
| 6,148,277 A | 11/2000 | Asava et al. |
| 6,161,176 A | 12/2000 | Hunter et al. |
| 6,209,018 B1 | 3/2001 | Ben-Shachar et al. |
| 6,314,460 B1 | 11/2001 | Knight et al. |
| 6,341,372 B1 * | 1/2002 | Datig .................. 717/136 |
| 6,397,378 B1 * | 5/2002 | Grey et al. ............ 717/175 |
| 6,421,719 B1 | 7/2002 | Lewis et al. |
| 6,490,690 B1 | 12/2002 | Gusler et al. |
| 6,735,691 B1 | 5/2004 | Capps et al. |
| 6,832,298 B2 | 12/2004 | Fujii et al. |
| 6,871,221 B1 | 3/2005 | Styles |
| 6,898,703 B1 | 5/2005 | Ogami et al. |
| 6,925,646 B1 | 8/2005 | Korenshtein et al. |
| 6,950,931 B2 | 9/2005 | Wedlake |
| 6,996,517 B1 | 2/2006 | Papaefstathiou |
| 7,054,924 B1 * | 5/2006 | Harvey et al. ............ 709/220 |
| 7,167,974 B2 | 1/2007 | Roth et al. |
| 7,188,335 B1 * | 3/2007 | Darr et al. ............... 717/121 |
| 7,246,345 B1 * | 7/2007 | Sharma et al. .......... 717/120 |
| 7,260,818 B1 * | 8/2007 | Iterum et al. ............ 717/170 |
| 7,320,007 B1 | 1/2008 | Chang |
| 7,343,601 B2 * | 3/2008 | Azagury et al. ......... 717/176 |

(Continued)

FOREIGN PATENT DOCUMENTS

EP   1486867 A1   12/2004

(Continued)

OTHER PUBLICATIONS

Schlee, et al. "Generative Programming of Graphical User Interfaces", 2004, ACM, p. 403-406.*

(Continued)

Primary Examiner — Wei Y Zhen
Assistant Examiner — Qamrun Nahar
(74) Attorney, Agent, or Firm — Schwegman, Lundberg & Woessner, P.A.

(57) ABSTRACT

A system and method are provided for integrating configuration templates. Usage-based configuration templates are created. The configuration templates are integrated into a configuration structure by assigning system instances to the configuration templates based on the usage of each of the system instances. The system instances are associated with one or more systems coupled with the configuration structure.

9 Claims, 12 Drawing Sheets

U.S. PATENT DOCUMENTS

| | | | |
|---|---|---|---|
| 7,373,661 | B2 | 5/2008 | Smith et al. |
| 7,412,687 | B2 | 8/2008 | Goodwin et al. |
| 7,447,701 | B2 | 11/2008 | Agarwal et al. |
| 7,480,643 | B2 | 1/2009 | Barsness et al. |
| 2003/0041235 | A1 | 2/2003 | Meyer |
| 2003/0055529 | A1 | 3/2003 | Aosawa |
| 2003/0221094 | A1 | 11/2003 | Pennarun |
| 2003/0225867 | A1* | 12/2003 | Wedlake .................. 709/222 |
| 2004/0117452 | A1 | 6/2004 | Lee et al. |
| 2004/0162930 | A1 | 8/2004 | Forin et al. |
| 2004/0187140 | A1 | 9/2004 | Aigner et al. |
| 2004/0205584 | A1 | 10/2004 | Pezzanite |
| 2004/0230787 | A1 | 11/2004 | Blumenau et al. |
| 2005/0005005 | A1 | 1/2005 | Styles et al. |
| 2005/0050175 | A1 | 3/2005 | Fong et al. |
| 2005/0065993 | A1 | 3/2005 | Honda et al. |
| 2005/0071195 | A1 | 3/2005 | Cassel et al. |
| 2005/0085937 | A1 | 4/2005 | Goodwin et al. |
| 2005/0144428 | A1 | 6/2005 | Rothman et al. |
| 2005/0144528 | A1 | 6/2005 | Bucher et al. |
| 2005/0144610 | A1* | 6/2005 | Zenz .......................... 717/168 |
| 2005/0240667 | A1 | 10/2005 | Koegel |
| 2005/0289169 | A1 | 12/2005 | Adya et al. |
| 2006/0041595 | A1 | 2/2006 | Taguchi et al. |
| 2006/0041881 | A1* | 2/2006 | Adkasthala .................. 717/168 |
| 2006/0047798 | A1 | 3/2006 | Feinleib et al. |
| 2006/0064673 | A1* | 3/2006 | Rogers et al. ................. 717/113 |
| 2006/0123409 | A1 | 6/2006 | Jordan, III et al. |
| 2006/0150178 | A1 | 7/2006 | Jerrard-Dunne et al. |
| 2006/0165123 | A1 | 7/2006 | Jerrard-Dunne et al. |
| 2006/0190579 | A1 | 8/2006 | Rachniowski et al. |
| 2006/0242626 | A1* | 10/2006 | Pham et al. ................... 717/121 |
| 2006/0242634 | A1 | 10/2006 | Fleischer et al. |
| 2007/0094359 | A1 | 4/2007 | Lamoureux |
| 2007/0118654 | A1 | 5/2007 | Jamkhedkar |
| 2007/0118888 | A1 | 5/2007 | Styles |
| 2007/0143480 | A1 | 6/2007 | Arroyo et al. |
| 2007/0156388 | A1 | 7/2007 | Kilian et al. |
| 2007/0156389 | A1 | 7/2007 | Kilian et al. |
| 2007/0156432 | A1 | 7/2007 | Mueller et al. |
| 2007/0156641 | A1 | 7/2007 | Mueller |
| 2007/0156715 | A1 | 7/2007 | Mueller |
| 2007/0156717 | A1 | 7/2007 | Zenz et al. |
| 2007/0157010 | A1 | 7/2007 | Zenz |
| 2007/0157172 | A1* | 7/2007 | Zenz et al. ................... 717/121 |
| 2007/0157185 | A1 | 7/2007 | Semerdzhiev |
| 2007/0162892 | A1 | 7/2007 | Zenz et al. |
| 2007/0165937 | A1 | 7/2007 | Mladen et al. |
| 2007/0168965 | A1 | 7/2007 | Zenz |
| 2007/0257715 | A1 | 11/2007 | Semerdzhiev et al. |

FOREIGN PATENT DOCUMENTS

| | | |
|---|---|---|
| GB | 2374687 A | 10/2002 |
| WO | WO-9626588 A1 | 8/1996 |
| WO | WO-2004109978 A1 | 12/2004 |
| WO | WO-2005045670 A1 | 5/2005 |
| WO | WO-2007076944 A1 | 7/2007 |

OTHER PUBLICATIONS

Feiler, P. H. "Software Process Support Through Software Configuration Management", 1990, IEEE, p. 58-60.*

"U.S. Appl. No. 11/322,400, Non Final Office Action mailed May 23, 2005", 9 pgs.

"U.S. Appl. No. 11/322,400, Notice of Allowance mailed May 18, 2009", 7 pgs.

"U.S. Appl. No. 11/322,401, Advisory Action mailed Feb. 26, 2009", 5 pgs.

"U.S. Appl. No. 11/322,401, Final Office Action mailed Nov. 19, 2008", 7 pgs.

"U.S. Appl. No. 11/322,401, Non Final Office Action mailed May 21, 2009", 10 pgs.

"U.S. Appl. No. 11/322,401, Non Final Office Action mailed May 22, 2008", 7 pgs.

"U.S. Appl. No. 11/322,401, Notice of Allowance mailed Dec. 31, 2009", 4 Pgs.

"U.S. Appl. No. 11/322,401, Preliminary Amendment filed Mar. 16, 2009", 11 pgs.

"U.S. Appl. No. 11/322,401, Response filed Feb. 19, 2009 to Final Office Action mailed Nov. 19, 2008", 7 pgs.

"U.S. Appl. No. 11/322,401, Response filed Aug. 22, 2008 to Non Final Office Action mailed May 22, 2008", 17 pgs.

"U.S. Appl. No. 11/322,401, Response filed Sep. 19, 2009 to Non Final Office Action mailed May 21, 2009", 10 pgs.

"U.S. Appl. No. 11/322,509, Non Final Office Action mailed Jan. 14, 2009", 11 pgs.

"U.S. Appl. No. 11/322,607, Non Final Office Action Jun. 26, 2008", 15 pgs.

"U.S. Appl. No. 11/322,607, Non Final Office Action mailed Jan. 8, 2008", 10 pgs.

"U.S. Appl. No. 11/322,608, Final Office Action mailed Jul. 8, 2009", 9 pgs.

"U.S. Appl. No. 11/322,608, Final Office Action mailed Sep. 4, 2008", 11 pgs.

"U.S. Appl. No. 11/322,608, Non Final Office Action mailed Feb. 13, 2009", 8 pgs.

"U.S. Appl. No. 11/322,608, Non Final Office Action mailed Feb. 20, 2008", 8 pgs.

"U.S. Appl. No. 11/322,701, Final Office Action mailed Sep. 2, 2008", 16 pgs.

"U.S. Appl. No. 11/322,701, Non Final Office Action mailed Mar. 19, 2008", 11 pgs.

"U.S. Appl. No. 11/322,701, Non-Final Office Action mailed Jul. 6, 2009", 15 pgs.

"U.S. Appl. No. 11/322,969, Non-Final Office Action mailed Apr. 1, 2009", 11 pgs.

"U.S. Appl. No. 11/322,969, Response filed Jun. 9, 2009 to Non Final Office Action mailed Apr. 1, 2009", 11 pgs.

"U.S. Appl. No. 11/323,110 , Notice of Allowance mailed Oct. 20, 2009", 6 pgs.

"U.S. Appl. No. 11/323,110, Non Final Office Action mailed Nov. 26, 2008", 10 pgs.

"U.S. Appl. No. 11/323,110, Notice of Allowance mailed May 29, 2009", 9 pgs.

"U.S. Appl. No. 11/323,110, Notice of Allowance mailed Feb. 17, 2010", 4 Pgs.

"U.S. Appl. No. 11/323,110, Response filed Feb. 25, 2009 to Non Final Office Action mailed Nov. 26, 2008", 9 pgs.

"U.S. Appl. No. 11/323,110, Response filed Oct. 27, 2008 to Restriction Requirement mailed Aug. 27, 2008", 10 pgs.

"U.S. Appl. No. 11/323,110, Restriction Requirement mailed Aug. 27, 2008", 7 pgs.

"U.S. Appl. No. 11/323,438, Non Final Office Action mailed Apr. 1, 2009", 21 pgs.

"U.S. Appl. No. 11/323,438, Response filed Jun. 30, 2009 to Non Final Office Action mailed Apr. 1, 2009", 14 pgs.

"U.S. Appl. No. 11/324,125, Non Final Office Action mailed Jan. 23, 2009", 8 pgs.

"International Application Serial No. PCT/EP2006/012356, International Search Report and Written Opinion mailed Mar. 29, 2007", 8 pgs.

"International Application Serial No. PCT/EP2006/012357, International Search Report and Written Opinion mailed Mar. 29, 2007", 9 pgs.

"International Application Serial No. PCT/EP2006/012358, International Search Report and Written Opinion dated Jun. 14, 2007", 11 pgs.

"International Application Serial No. PCT/EP2006/012421, International Search Report and Written Opinion dated Oct. 2, 2007", 14 pgs.

"J2EE Engine Bootstrap", *BIS Techdev*, printed on Sep. 26, 2005, [Online]. Retrieved from the Internet: <URL: http://bis.wdf.sap.corp/twiki/bin/view/Techdev/J2EEEngineBootstrap>, 1-15.

"Microsoft Computer Dictionary", *Microsoft Press, 4th Edition, Redmond, WA*, (1999), 123 & 183.

"Using a Template Processor to Simplify Programming", *Research Disclosure, Mason Publications, Hampshire, GB, vol. 41, No. 413*, (Sep. 1, 1998), 3 pgs.

Accomazzi, Alberto, et al., "Mirroring the Ads Bibliographic Databases", *Astronomical Analysis Software and Systems VII, ASP Conference Series, vol. 145*, (1998), 395-399.

Bartell, Randy L., et al., "The MediaXact System—A Framework for Personalized Electronic Commerce Systems", *Bell Labs Technical Jornal, vol. 4, Issues 153-173*, (Apr.-Jun. 1999), 153-173.

Cutler, Ellie, "SCO Unix in a Nutshell", *O'Reilly & Associates, Inc., Cambridge, MA*, (Jan. 1994), 154-158.

Duquette, William H., et al., "Data Definition and Code Generation in TCL", *RIDE-VE '99, Sydney, Australia*, (Mar. 23-24, 1999), 1-10.

Feller, Peter H., "Software Process Support Through Software Configuration Management", *IEEE*, (1990), 58-60.

Fernandez, Mary, et al., "Silkroute: Trading Between Relations and XML", *Computer Networks, vol. 33, Issues 1-6*, (Jun. 2000), 723-745.

Hall, et al., "Design: A Generic Configuration Shell, Proc of the 3rd International Conf. on industrial and engineering applications of artificial intelligence and expert systems", vol. 1, Charleston, SC 1990, 500-508 pgs.

Hatley, John W., "Automatically Generating Procedure Code and Database Maintenance Scripts", *Ingres World, Chicago, IL*, (Oct. 2-6, 1994), 11 pgs.

Heiss, Kurt, "Oracle Process Manager and Notification Server: Administrator's Guide", *10g Release 2 (10.1.2), [Online]. Retrieved from the Internet: <URL: http://download.oracle.com/docs/cd/B14099_01/core.1012/b13996.pdf>*[Retrieved on Sep. 31, 2007], (Dec. 2004), 1-1 to 1-26 & 3-1 to 3-30.

Karlsson, et al., "Method Configuration: Adapting to situational characteristics while creating reusable assets", *Information and software technology*, vol. 46, Issue 9, (Jul. 1, 2004), 619-633 pgs.

Leffler, et al., "Building Berkeley UNIX Kernels with Config", *Computer Systems research Group*, (Apr. 17, 1991), 2-1 and 2-31 pgs.

Robbins, et al., "Unix in a nutshell", 3rd edition, O'Reily & Associates, INC, (Aug. 1999), 215-221 and 265-266 pgs.

Schwanke, et al., "Configuration Management in BiiN SMS", *Proc. of the 11th International Conf. on software engineering Pittsburgh*, (383-393 pgs), 1989.

Symantec, Corp., "Norton Ghost™ User's Guide", *Norton Ghost™User's Guide-Symantec. Norton Ghost The fast pc cloning solution*, (1999), 138 pgs.

Williams, et al., "Embedded Linux as a platform for dynamically self-reconfiguration systems-ON-CHIP", (21-24 pgs), 163-169 pgs.

"U.S. Appl. No. 11/322,401, Notice of Allowance mailed Jun. 1, 2010", 5 pgs.

"U.S. Appl. No. 11/322,401, Response filed Apr. 14, 2010 to Ex Parte Quayle Action mailed Mar. 30, 2010", 4 pgs.

\* cited by examiner

TEMPLATE INTEGRATION

FIELD

Embodiments of this invention relate generally to installation and configuration of enterprise software, and in particular, but not exclusively, relate to integrating configuration templates into a configuration structure in an enterprise environment.

BACKGROUND

FIG. 1 illustrates a prior art enterprise system 100. AS instances 105 may be web application servers, such as Web AS by SAP AG of Walldorf, Germany. AS instances 105 provide a framework to deploy a variety of business and presentation software packages for use in an enterprise environment. AS instances 105 are installed on one or more machines 110 and grouped into a cluster 115. The cluster 115 of AS instances 105 are provided to service work requests 120 received from client nodes 125. Cluster 115 may further include a message node or machine 130 supporting a message server or machine 135, a database node 140 supporting a database 145, and a web dispatcher 150.

Each AS instance 105 may include one or more virtual machines (VMs) 155 to interpret programs providing the presentation and business logic to service work requests 120. These VM may include JAVA VMs (JVMs) compliant with the JAVA 2 Platform, Standard Edition (J2SE), etc. A VM is an example of a runtime system. A VM is an abstract machine that can include an instruction set, a set of registers, a stack, a heap, and a method area, like a real machine or processor. A VM essentially acts as an interface between program code and the actual processor or hardware platform on which the program code is to be executed.

Web dispatcher 150 implements a load-balancing mechanism distributing work requests 120 from client nodes 125 among machines 110 within cluster 115. Web dispatcher 150 may be one of machines 110 having the task of dispatching work requests 120 among machines 110 of cluster 115 or a stand alone hardware node. Work requests 120 are processed by machines 110 and may subsequently be provided to database node 140. Database node 140 offers up the requested data to machines 110, which in turn process and format the results for display on client nodes 125. Each AS instance 105 may further include its own dispatcher mechanism to distribute work requests 120 assigned to it among its individual VMs 155.

Installation files 160 for installing AS instances 105 may be centrally stored within database 145. To deploy each AS instances 105, installation files 160 are copied from database node 140 to each machine 110 via a network link. Once copied, installation files 160 are installed generating a file system and establishing AS instances 105 on each machine 110. When freshly installed, each AS instance 105 is deployed with a default configuration installation for VMs 155 and the applications and services deployed therewith. AS instances 105 may be operated using the default configuration installation; however, this does not guarantee that all available resources will be utilized optimally or that AS instances 105 will function properly.

Typically, once each AS instance 105 is up and running with the default installation configuration, a user manually configures each AS instance 105. Manual configuration generally requires a sophisticated knowledge about the hardware and OS platforms, as well as, the tasks to be performed by each AS instance 105. The user configuring a default installation configuration may need to determine and input a large number of parameters unique to each AS instance 105 in a time consuming and error prone processes.

Furthermore, the conventional configuration technique with the JAVA stack relies on system-dependent information which is heavily and redundantly distributed across the entire cluster configuration tree. This, for example, makes it impossible to adjust the configuration when system settings (e.g., JAVA home, system name, instance number, host names, etc.) are changed. Also, since system-dependent settings are statically configured within the configuration database, when the system environment changes (e.g., due a system copy), these settings are to be adapted manually, which makes it impossible to move a configuration, as is, from one system to another. Further, there is a high risk of inconsistent configuration of cluster nodes running on the same instance.

SUMMARY

A system and method are provided for integrating configuration templates. In one embodiment, usage-based configuration templates are created. The usage-based configuration templates are integrated into a configuration structure by assigning system instances to the configuration templates based on usage of each of the system instances. In one embodiment, a system instance is associated with a system coupled with the configuration structure. In one embodiment, the configuration structure includes several levels, such as a default configuration level, a configuration templates level, and a system configuration level. Furthermore, in one embodiment, configuration templates are deployed and later activated to be used by users.

The above attributes may be implemented using a computer program, a method, a system or apparatus, or any combination of computer programs, methods, or systems. These and other details of one or more embodiments of the invention are set forth in the accompanying drawings and in the description below.

BRIEF DESCRIPTION OF THE DRAWINGS

Embodiments are illustrated by way of example and not by way of limitation in the figures of the accompanying drawings in which like references indicate similar elements unless otherwise specified. It should be noted that references to "an" or "one" embodiment in this disclosure are not necessarily to the same embodiment, and such references mean at least one.

DETAILED DESCRIPTION

Figure 1:
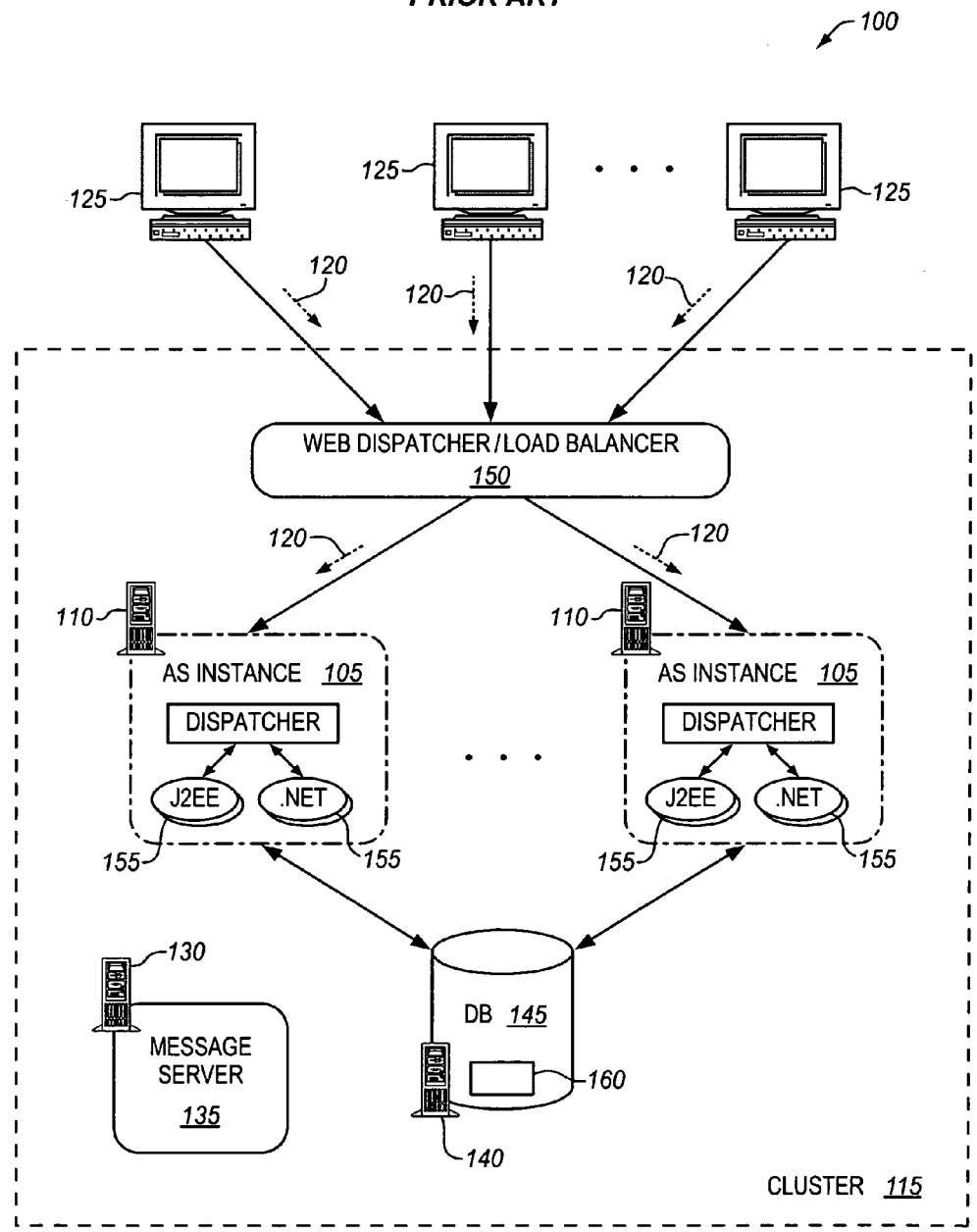
FIG. 1 illustrates a prior art enterprise system.
Figure 2:
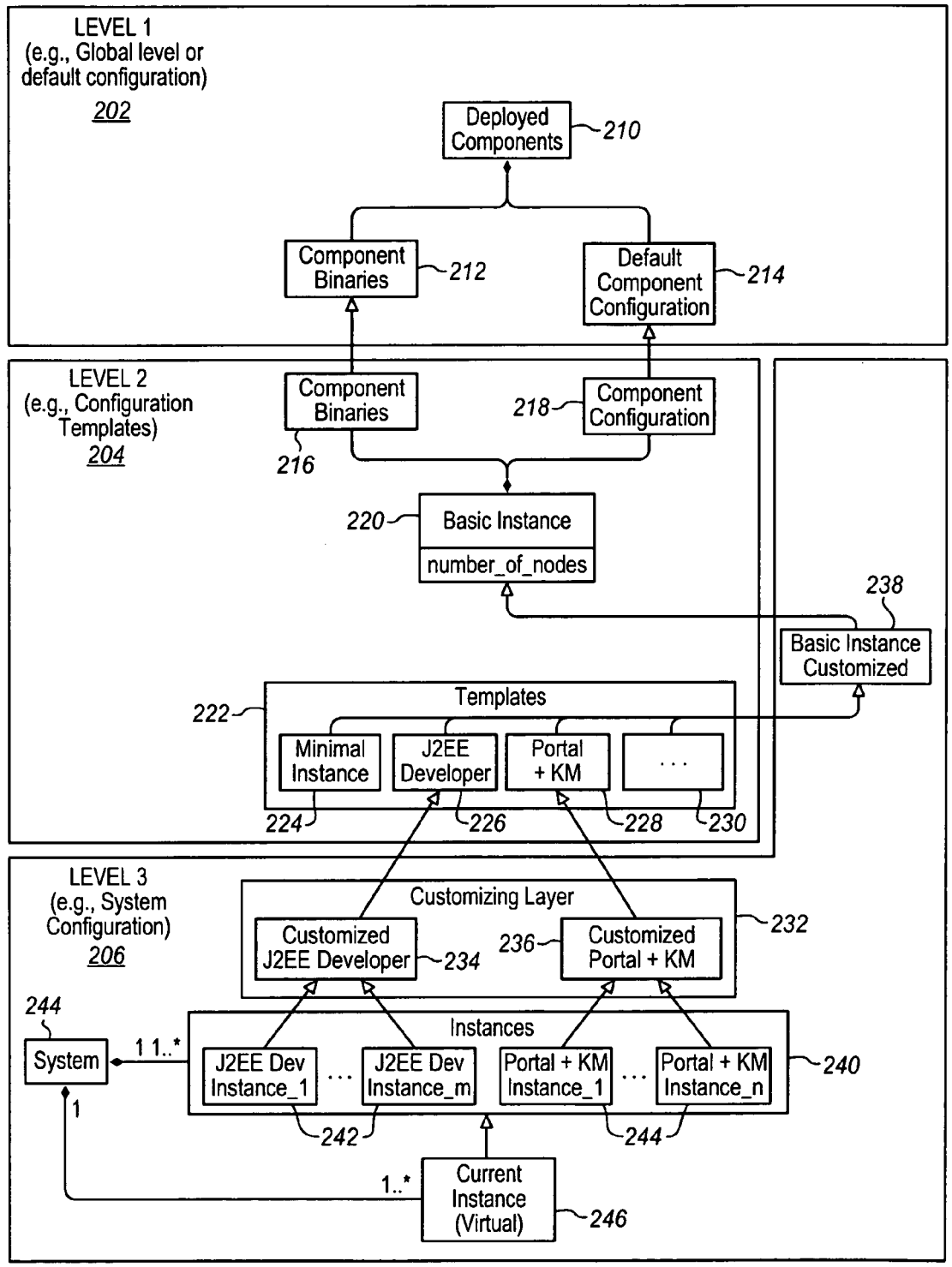
FIG. 2 illustrates an embodiment of a configuration architecture.

FIG. 2 illustrates an embodiment of a configuration architecture 200. In one embodiment, configuration architecture 200 provides dynamic configuration that is not system-based, i.e., it is dynamic and system-independent. For example, a change in the system environment may dynamically change the overall configuration. Changes in the system environment, such as system name, instance name, hosts, JAVA home, etc., are made without changing the configuration in the configuration database. This may also help support load-based installation and system copies with a minimum of reconfiguration overhead. Further, additional hardware may dynamically change the instance layout (e.g., the number of server nodes is calculated out of the available memory and the number of processors). Configuration architecture 200 further provides template-based configuration such templates 222 may contain the engine's use case scenario-specific configuration. Further, an instance 240 may be configured according to a configuration template 222. In one embodiment, instances 240 include server nodes (e.g., VMs, JVMs, etc.), JAVA Management System (JMS) instances, application instances, etc. For example, a single instance 242 may include a homogenous set of server nodes (e.g., JVMs). While one instance may run on one physical machine, a single physical machine may have running multiple instances 240. A collection of instances 242, 244 may be referred to as cluster of instances 240. A cluster 240 may span over several physical machines.

Configuration architecture 200 depicts a general cluster configuration structure which is presented here in three levels 202, 204, 206. In one embodiment, the three levels include deployed components and default configuration level (level 1) 202, configuration template level (level 2) 204, and system configuration level (level 3) 206. Lower levels derive or inherit from higher levels and may overwrite settings. For examples, from bottom up, level 3 206 includes instance configuration level which inherits from level 2 204 which inherits from deployed components and default configuration 202. Level 1 202, generally, and/or deployed components 210, specifically, may be referred to as "global area" or "global." Customer-side modifications may be made at level 3 206, while the content delivered by the provider (e.g., SAP AG) may be kept separate from and independent of customer modifications.

In one embodiment, default configuration level or level 1 202 may provide a system-independent default configuration that is abstract and derived from standard instance via deployed default component configuration 214. This configuration information is inherited at basic instance 220 where the information from level 1 202 is aggregated and further inherited at basic instance customized 238. Configuration information at basic instance customized 238 may then be used to generate templates 222 that are use- or usage-specific. Level 1 202 may also include component binaries 212 that are inherited at component binaries 216 at level 2 204 and aggregated at basic instance 220 along with configuration information from component configuration 218. At basic instance 220, a number of nodes, the configuration of which may be abstract, may also be assigned to basic instance 220.

Configuration template level or level 2 204 may include predefined instance configuration for specific use cases and scenarios, such as portal+KM, minimal instance, JAVA 2 Platform, Enterprise Edition (J2EE) developer, etc. For example, at level 3 206, instances 240 in communication with system 244 include J2EE developer instances 242 and portal+KM instances 244 that are provided via customized J2EE developer 234 and customized portal+KM 236, respectively, at customized layer 232 further via templates J2EE 226 and portal+KM 228 of templates 222 at configuration template 204. Current instance 246 may include a virtual instance that has a parameterized link to an instance 240 running in a given system context (e.g., containing the instance identification as parameter). During runtime, configuration consumers access current instance 246 that points to the right instance from instances 240 during runtime. Stated differently, at runtime, current instance 246 is assigned to a particular instance of instances 240 that the component can access.

In one embodiment, level 2 204 contains a system-independent configuration that is configured or provided via dynamic configuration that includes parameterized settings, computed settings and/or value links. This system-independent configuration may be moved between different systems with ease. Further, level 2 204 and its contents are derived from default configuration and overwrite the settings according to each of the specific usages to which templates 222 are assigned. Also, instances 240 are homogenously configured, which means all server nodes (e.g., virtual machines) of instances 240 may share the one and the same configuration.

Level 2 204 contains several configurations, such as instance layout configuration, VM configuration, kernel configuration, service settings, application configuration, cluster file system configurations, and runtime filter configuration, etc. For example, the instance layout may contain the configuration about the number of server nodes running on that particular instance. The instance layout may be configured via a simple numeric property which specifies the number of server nodes. This property is by default defined as an arithmetic expression dependent on the hardware available for the instance (e.g., dependent on the number of processors and the amount of available memory). Thus, the instance layout dynamically adapts itself to the environment on which the instance is running. In a high-end environment, an instance may include a higher number of server nodes, where in a low-end environment (e.g., developer personal computer), merely a single server node may be running on the instance.

Similarly, a VM or JVM configuration may contain VM memory settings and parameters. These settings are specified in a system-independent way via parameterized and computed configuration entries. The maximum heap size could, for example, be configured as an arithmetic expression dependent on the amount of physical memory and the number of server nodes running on a particular instance. These settings are dynamically adapted to a specific environment. A kernel configuration may contain system-independent properties of the manager components of the engine. These settings are abstracted via parameterized and computed settings. Service settings may contain system-independent service properties of each service component which is part of the installation. As with the VM and kernel configurations, these settings are abstracted via parameterized and computed settings. An application configuration may contain system-independent application configuration of each application which is part of the installation.

A cluster file system configuration may contain the system-independent configuration of components that are deployed into the file system (e.g., configuration tool, visual administration, etc.). The bootstrap process may be responsible for synchronizing this configuration (along with components themselves) to the file system. During synchronization, a configuration manager may transparently substitute dynamic settings, and thus, in the file systems, the settings may be static. A runtime filter configuration may contain the configuration to enable and disable components according to the use case/scenario associated with templates 222. The installation may contain more components than those that are actually used in a specific use case and scenario. Those components that are not needed are disabled, and those components that are needed are enabled via runtime filter configuration. For example, in J2EE developer template 226, the runtime filter configuration may disable every component except those components that are needed in a J2EE developer scenario.

In one embodiment, configuration templates 222 are derived from configuration basic instance 220, which defines the basic structure of the instance configuration. Further, this derivation may not be direct, but instead, another level basic instance customized 238 may exist in between basic instance 220 and configuration templates 222. Basic instance customized 238 may belong to system configuration and is the place where system global configuration changes can be stored. While the deployment of templates 222 occurs at level 2 204, the modification or customization of templates 222 can be performed at level 3 206 via Application Programming Interfaces (APIs) and administrative tools. Minimal instance 224 includes a template that is used during the instance installation and contains components that are needed to run the central configuration. A central configuration may be used to select and set the specific usage case template for instances 240 to be configured.

In one embodiment, a template configuration tool may be used to generate and configure templates 222 and to provide functionalities for managing the general flow of the auto-configuration process. For example, the auto-configuration process may activate an already existing template 222 by assigning one or more of system instances 240 to that template 222. Templates 222 may include use- or usage-based templates that are system-independent, but they may include any combination of software platform dependent parameters, hardware platform dependent parameters, and/or use-case dependent parameters.

System configuration 206 may contain an actual configuration, such as a configuration of the actual instance 240 belonging to a system. Each instance 240 may be assigned a usage-case scenario which is to be executed by the corresponding instance 240 during runtime. Thus, the instance configuration is derived from configuration templates 222 associated with the corresponding use case and scenario. Further, templates 222 contain system dependencies dynamically (e.g., via parameterized and computed settings), so there is no need to overwrite these settings in the actual instance configuration. Various configurations may dynamically adapt themselves to an actual system environment. Therefore, the engine runtime itself may not need any additional configuration, so it is functional without overwriting any settings inherited from templates 222.

Some engine components (e.g., configuring landscape connectivity, etc.) may, however, be configured at customizing layer 232 associated with templates 222. For example, when an instance 242 for a specific configuration template 226 is generated, a customizing configuration 234 for the template 226 is created with system configuration 206. Further, a customizing configuration 234 is derived from an actual template 226, while an instance configuration 242 is derived from the customizing layer 234 of a selected template 226. Any configuration changes at the level of customizing layer 232 may be visible across instances 240 that are associated with configuration templates 222. For example, any configuration changes at the level of customized portal+KM 236 apply to all portal+KM instances 244 within the cluster.

In one embodiment, when configuration changes in a single instance 242-244 is needed, such changes may be made to a particular instance 242-244 at the instance level at system configuration 206. However, in certain cases, when changes in configuration settings are needed for the entire system, such as system 244 (e.g., for all usages that are activated in system 244), the changes may be made for all instances, such as J2EE developer and portal+KM instances 242-244, in communication with system 244. In this case, configuration changes may be made at the level of basic instance customized 238 which are then inherited down to instances 240 via templates 222 and customizing layer 232. Also, such configuration changes or settings may be visible globally as long as the settings are not locally overwritten. It is to be noted that for brevity and clarity, merely the illustrated instances 240, templates 222, etc., are provided, but many more and fewer instances, templates, and other components, modules, etc., may be employed. For example, one or more of instances 240 may be configured via the same configuration template.

Figure 3:
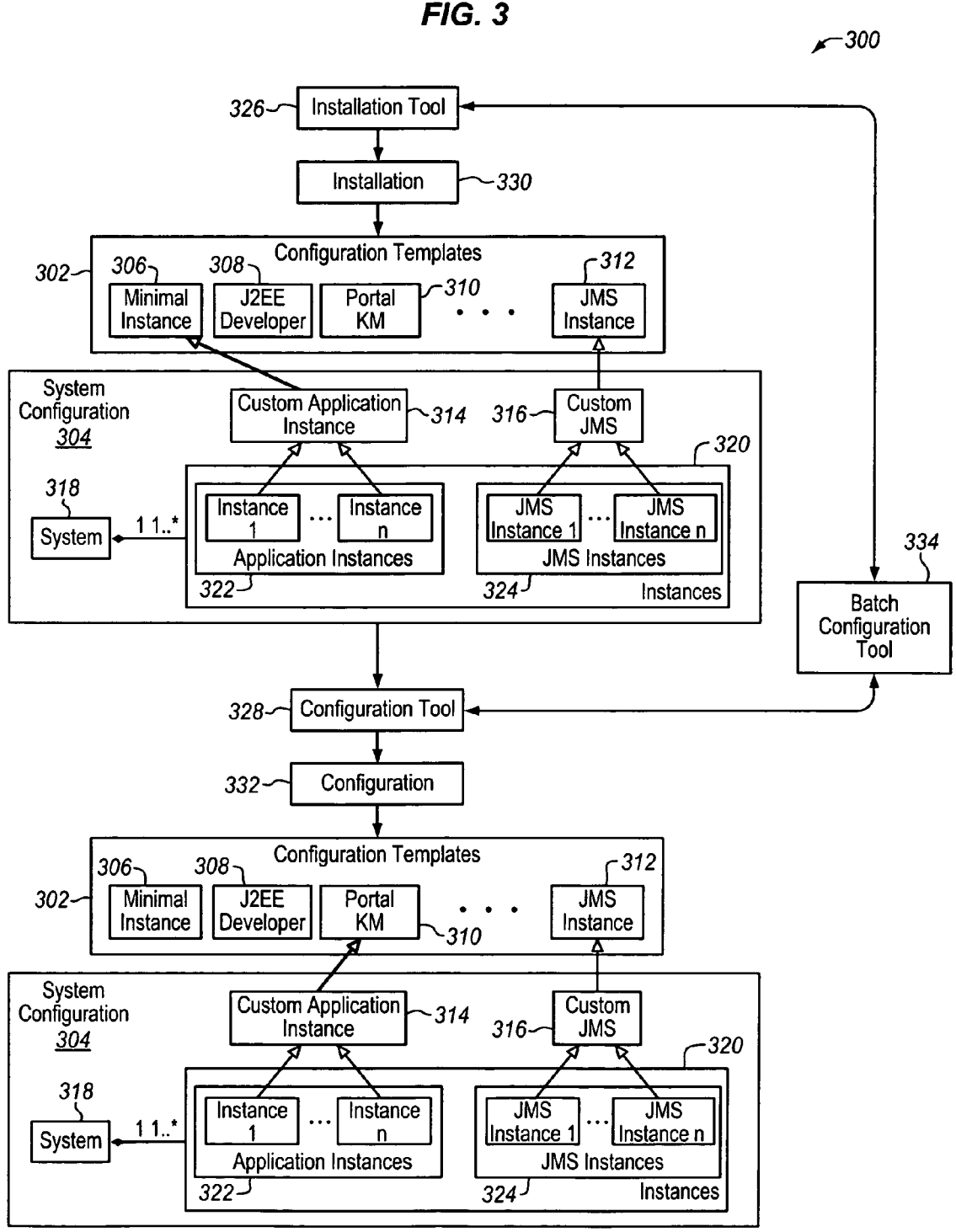
FIG. 3 illustrates an embodiment of installation and configuration of components.

FIG. 3 illustrates an embodiment of installation and configuration of components. As illustrated, system configuration 332 may be decoupled from system installation 330. In one embodiment, installation tool 326 provides installation 330, while configuration tool 328 provides configuration 332 for system 318. During system installation 330, via installation tool 326, one or more instances 320 with a minimum configuration are installed via minimal instance template 306. Minimal instance 306 may contain components that are needed to run central configuration 332. A central configuration may be used, via configuration tool 328, to select and set a specific usage-based template for instances 320 as well as for configuring existing custom values.

In one embodiment, installation 330 provides an entire system database (e.g., J2EE configuration) and a complete file system environment which is needed. For example, installation 330 provides an instance installation that provides a file system environment for instances 320 and prepares instances 320 within the configuration database. For example, the two based kinds of instance configuration may include (1) application instances 322 and JMS instances 324 that are optionally installed in case JMS services are separated from applications. When installing application instances 322, a particular usage of the instance may not be defined at this point; however, the usage may be later defined during configuration 332. Thus, during installation 330, first, minimal instance 306 is configured as it contains all the necessary components needed to subsequently run central configuration 332. Minimal instance 306 may be configured via an appropriate configuration template. Further, the instance installation may be performed via a batch configuration tool provided by the engine to create the instance configuration in the database and assign it to minimal instance configuration template 306.

For installing JMS instances 324, JMS instance configuration template 312 may be used. JMS instance 312 may be made available as part of the configuration database. During the installation 330 of JMS instances 324, the installation tool 326 may use a batch configuration tool to create the instance configuration in the database and assign it to JMS instance configuration template 312.

Central configuration 332 is performed via configuration tool 328 that, for example, runs within the J2EE engine. Configuration tool 328 may be used to manage the configuration of system landscapes via corresponding configuration templates 302. The management of configuration templates 302 by configuration tool 328 may not only merely include one or more instances 320, but also a landscape of several systems. For example, J2EE configuration templates within the J2EE engine may also be configured based on usages. Configuration 332 may be broader in scope than a typical J2EE configuration. For example, configuration tool 328 may help facilitate activation and/or customization of templates 302. Various J2EE configuration templates may be made available in software delivery archive (SDA) that is deployed into the J2EE engine prior to installing and configuring J2EE instances. Configuration tool 328 may use J2EE configuration templates during configuration 332 by assigning each instance configuration to the appropriate J2EE configuration template. After the installation of templates 302, configuration 302 may also provide activation and/or customization of templates 302.

As discussed previously, during installation 330 of application instances 322, the usage of instances 322 may not be known; however, during installation 330, application instances 322 are configured via minimal instance 306, which may be sufficient to run central configuration 332. Subsequently, during configuration 332, application instances 322 are to be configured for specific usages. During configuration 332, a custom layer configuration (e.g., the layer from which instance configurations are derived), including custom application instance 314, may be assigned to a configuration template (e.g., portal+KM 310) according to a particular usage of the system 318. This custom configuration (e.g., custom application instance 314) may be derived from a selected configuration template (e.g., portal+KM 310), while the instance configuration of application instances 322 may be obtained from the custom configuration.

In one embodiment, configuration templates 302 provided within the J2EE engine are system-independent (e.g., obtained by configuring the system-dependent settings via parameterized and arithmetic expressions), and thus, the settings are correct and do not need to be changed or reviewed during configuration 332. This is particularly necessary for certain settings/modifications, such as instance layouts, VM configurations, kernel configurations, several system-dependent application and service settings, etc. The customizing of additional engine components (e.g., configuring landscape connectivity, etc.) may still be performed. For example, when certain settings are to be modified for all instances (e.g., JMS instance 1 thru JMS instance n of JMS instances 324), using configuration tool 328, configuration 332 may involve modifying such settings by accessing custom configurations (e.g., custom JMS 316, etc.) corresponding to those instances and making changes there. However, when configuration settings of a particular instance (e.g., JMS instance 1 of JMS instances 324) are to be changed, such settings may be changed at the level of that particular instance, such as by directly modifying configuration settings of a JMS instance 1.

Furthermore, a J2EE configuration tool belonging to the J2EE engine core layer may be used for an offline configuration of the J2EE engine system. This configuration provides a configuration for instance layouts (e.g., the number of nodes running on an instance), VMs or JVMs according to VM types and platforms, kernel (e.g., manager) properties, service properties, application properties (e.g., sap.application.global.properties), and runtime filters for activation and deactivation of components according to a particular usage, etc., as described with reference to FIG. 2. Further, a J2EE configuration tool may allow the modification of configuration at the following two levels: (1) particular instance 322-324; and (2) configuration template 306-312. For example, when changing the configuration at the level of a particular instance (e.g., instance 1 of application instances 322), the change is made merely to the specific instance. However, when changing the configuration at the level of a configuration template (e.g., JMS instance 312), this configuration change may impact all those instances (e.g., JMS instances 324) that correspond to and are configured via that particular configuration template. The J2EE configuration tool may not provide the editing of configuration template 302, but instead, it may allow for the editing of custom templates 314-316 for specific configuration templates 302. Using this technique, customer settings are kept separated from the default settings provided by the provider (e.g., SAP AG) that are deployed into the system.

Figure 4:
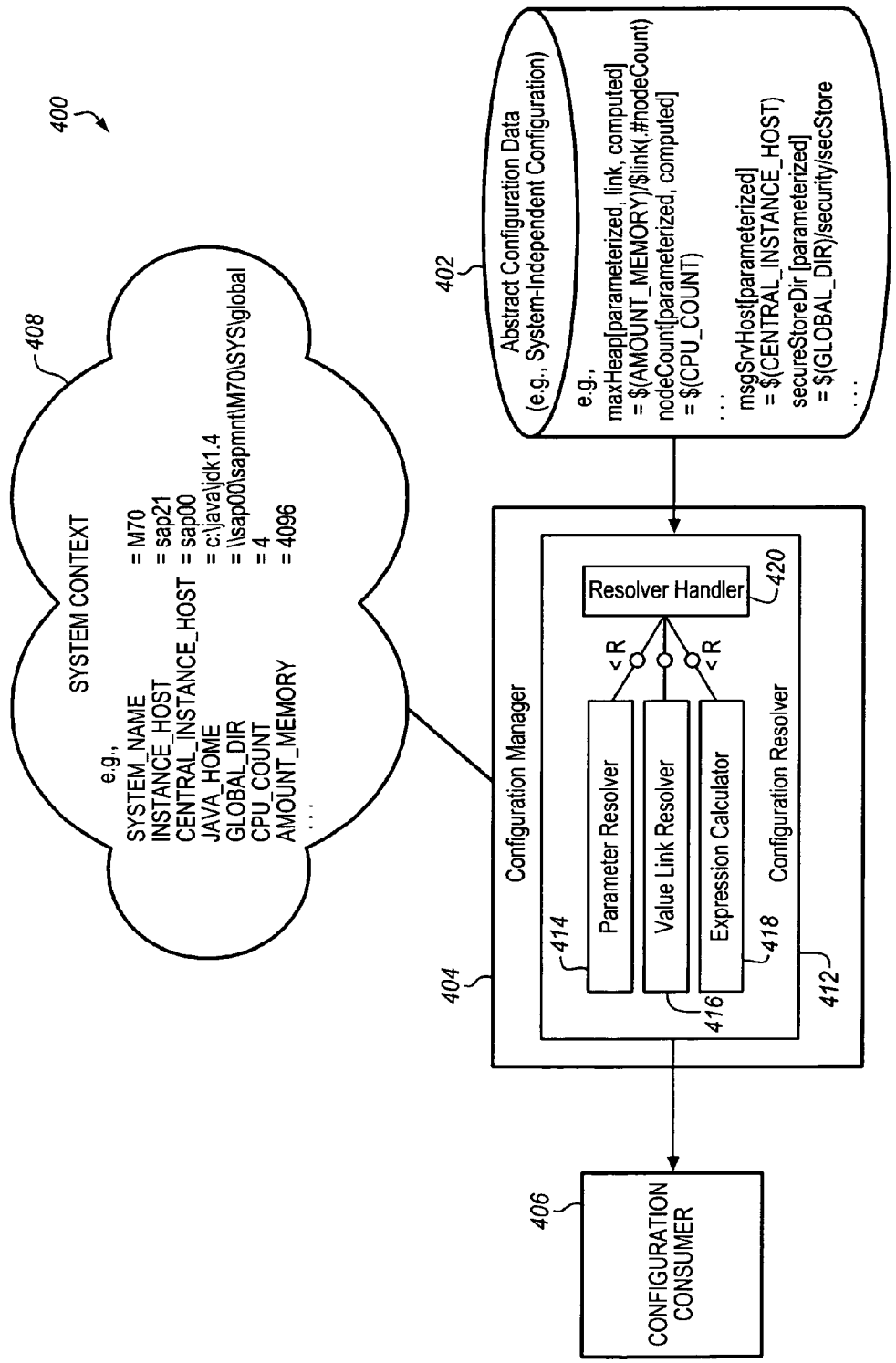
FIG. 4 illustrates an embodiment of a configuration architecture.

FIG. 4 illustrates an embodiment of a configuration architecture 400. In one embodiment, abstract configuration architecture 400 provides for how various components may define their configuration in a system-independent manner. Abstract configuration architecture 400 includes abstract configuration data 402 coupled with configuration manager or machine 404 and further coupled with configuration consumer 406. Abstract configuration data 402 includes meta attributes that are attached to various settings stored at abstract configuration data 402. These meta attributes of abstract configuration data 402 are communicated to configuration manager 404.

Configuration manager 404 may include configuration resolver 412, which further includes resolver handler 420, parameter resolver 414, value link resolver 416, and expression calculator 418. Once the meta attributes from abstract configuration data 402 are communicated to configuration manager 404, based on these meta attributes (e.g., parameterized, link, and/or computed), various resolvers are called for parameter resolver 414, value link resolver 416, and/or expression calculator 418. Furthermore, system context 408 corresponds to the same configuration data (e.g., due to system copy, etc.) and is communicated to configuration manager 404. A resolved configuration is then communicated to configuration consumer 406. System context 408 defines system, system name, etc., having different areas of inputs in system context 408. Any relevant hardware information may be gathered automatically via an operating system. Although, users may provide some installation settings (e.g., system name, instance name, etc.) during installation, host names may be gathered from the operating system.

In one embodiment, configuration manager 404 allows the configuration to be dynamic and to adapt itself to a specific system environment. This is achieved by configuration manager 404 by providing parameterized configuration entries and computed configuration entries. The dynamic configuration as provided by configuration manager 404 permits the use of the parameterized settings rather than the static values. Stated differently, configuration manager 404 accesses a set of system parameters (e.g., host names, instance name, number of processors, available memory, etc.) which are defined during a startup time. Using configuration manager 404, the configuration settings, which depend on the system environment, are not configured as static values, but instead, they reference those system parameters that are accessed by configuration manager 404. This is accomplished by configuration manager 404 by providing various types of configuration settings, such as parameterized settings, value link settings, computed settings, and inherited settings.

The parameterized settings containing system parameters may be provided by configuration manager 404 and are resolved via parameter resolver 414. These parameters may be transparently substituted during runtime. The parameterized settings may also be used for system dependent settings, which can be resolved by a simple parameter substitution.

Various computed settings include simple arithmetic expressions containing system parameters from a system profile provided within configuration manager 404. These computed settings are provided via expression calculator 418. During runtime, the parameters are transparently substituted and the arithmetic expression is evaluated. The computed settings are used when a simple parameter substitution is not sufficient and the value needs to be calculated out of specific system parameters (e.g., cache sizes, heap size, etc.). Settings containing a link to other settings (e.g., value link) are used when a setting is dependent on another setting which is stored elsewhere. During runtime, the value link is transparently resolved and substituted. Value link settings are resolved via value link resolver 416. The settings containing value links may be combined with various features of computed values. Using these settings, for example, configuration manager 404 allows J2EE engine components to adapt their configuration dynamically to the system environment in which they are running. The changing of the system environment, which changes system parameters, dynamically changes the configuration. Configuration manager 404 and other components of abstract configuration architecture 400 allow various components to define their configuration such that they are system-independent.

Figure 5:
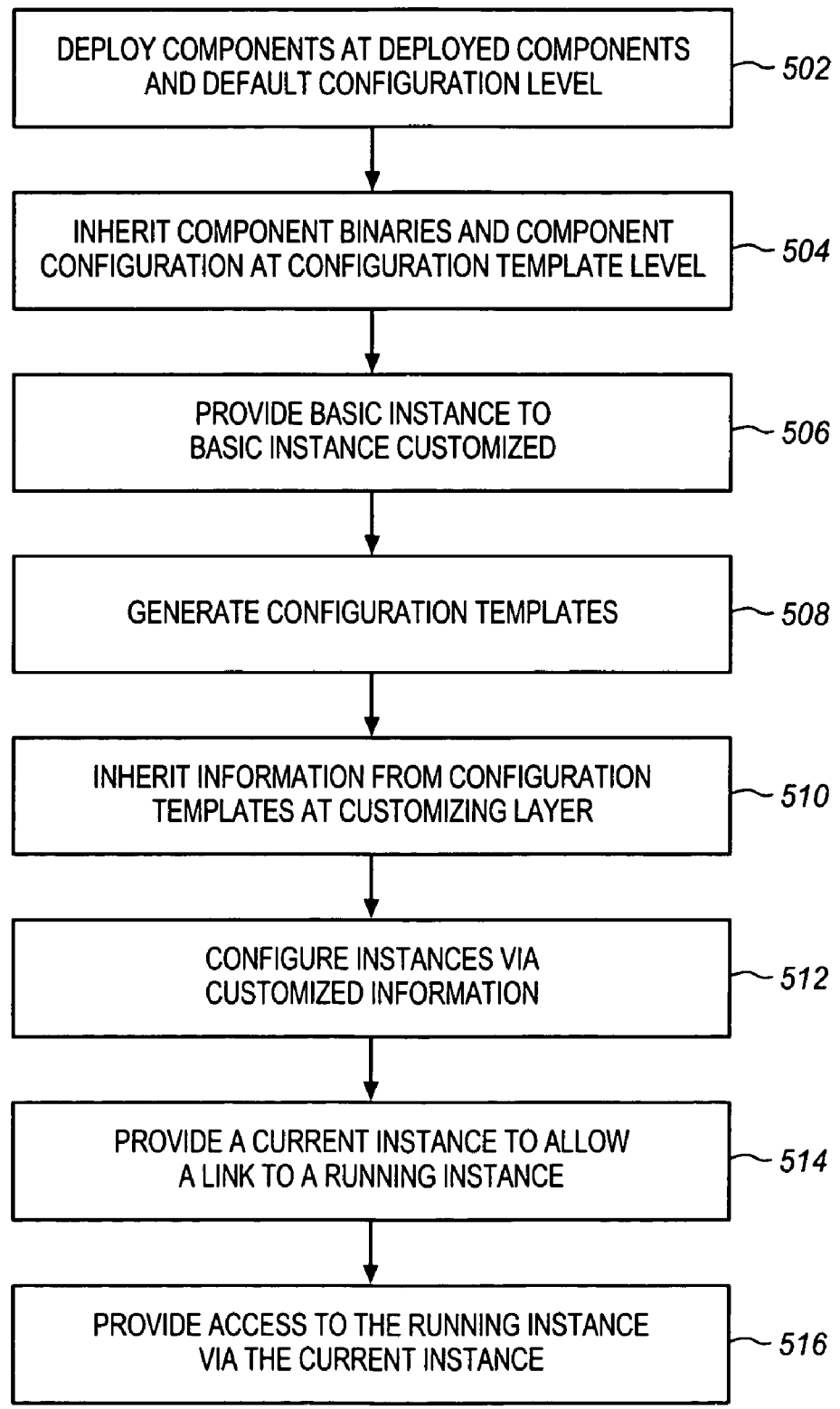
FIG. 5 illustrates an embodiment of a process for providing multiple levels in a configuration architecture.

FIG. 5 illustrates an embodiment of a process for providing multiple levels in a configuration architecture. In one embodiment, at processing block 502, various components are deployed at the deployed components and default configuration level of the configuration architecture. These components may provide component binaries and default component configurations. At processing block 504, component binaries and component configurations are inherited at the configuration template level and provided to a basic instance at processing block 506. At processing block 506, information from the basic instance is inherited at a customized basic instance a basic instance customized. In one embodiment, the customized basic instance may reside at the system configuration level, while the basic instance resides at the configuration template level.

Using the information inherited from the default configuration level, also known as the global level, various configuration templates are generated and/or customized at the configuration template level at processing block 508. A template customization and/or configuration tool may be used to customize configuration templates, such as generate and/or customize the configuration template. Examples of such templates include J2EE developer, portal+KM, minimal instance, etc. The information from these configuration templates is inherited at the customizing layer forming customized information at the system configuration level at processing block 510. For each active template, the customizing (system) layer may contain a custom template (which may, by default, be empty). For example, a template "J2EE developer" at the templates layer may have a corresponding custom template "J2EE developer" at the system layer.

The customized information via customized developers is then used to configure default instances into new configured instances at the system configuration level at processing block 512. Stated differently, customized configuration templates are applied to default instances to configure them into configured instances. Default instances may be configured via an instance configuration tool. Default and configured instances may include application server instances. Examples of instances include J2EE development instance, portal+KM instance, etc. Further, such instances are in communication with a system. At processing block 514, a current instance, which includes a virtual instance, is provided to allow a parameterized link to a running instance of one of the instances. Also, during runtime, configuration consumers are provided access to the running instance via the current instance at processing block 516.

Figure 6:
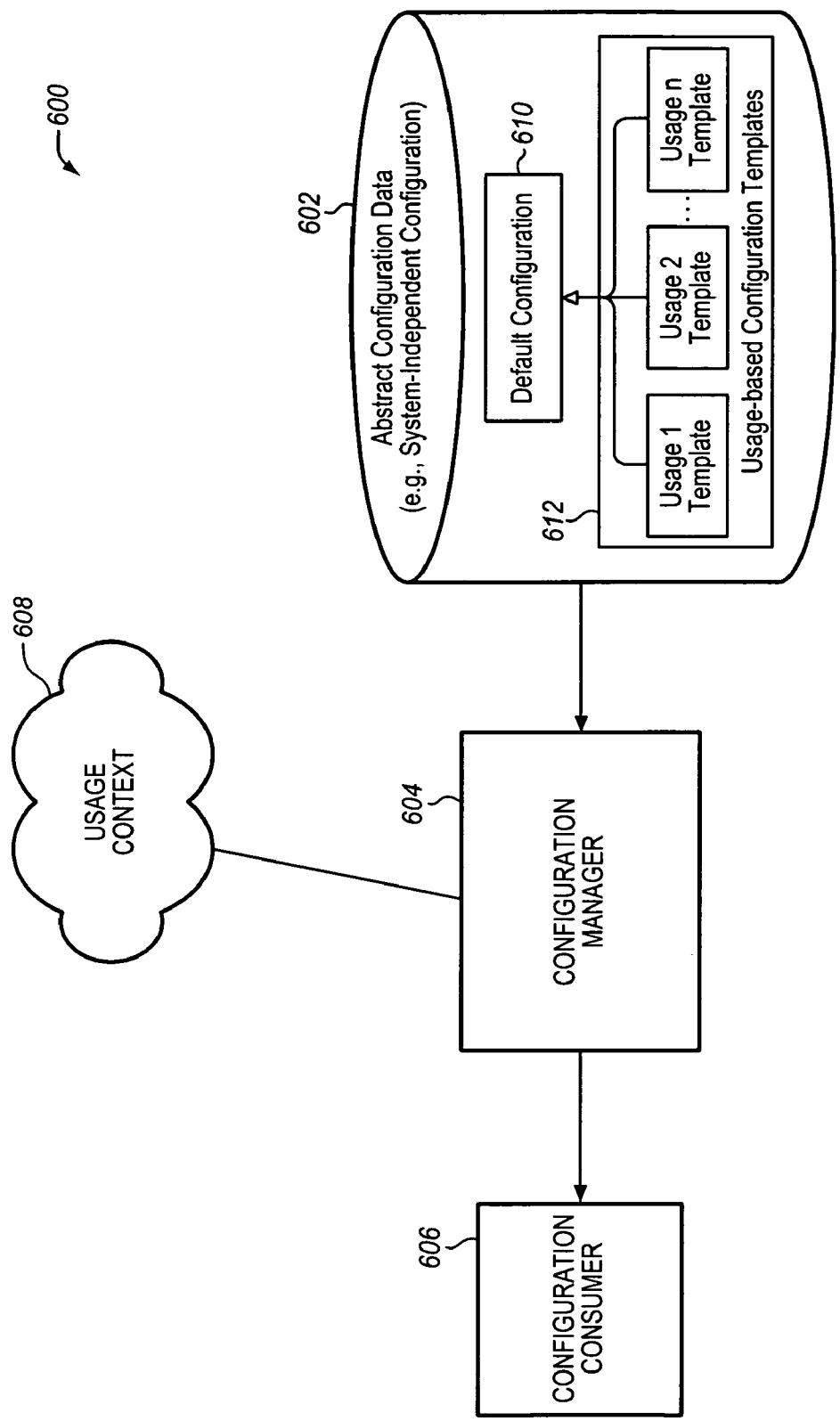
FIG. 6 illustrates an embodiment of a configuration architecture.

FIG. 6 illustrates an embodiment of a configuration architecture 600. In one embodiment, abstract configuration architecture 600 provides how components may define their configuration in a system-independent manner. Abstract configuration architecture 600 includes abstract configuration data 602 in communication with configuration manager or machine 604 and further in communication with configuration consumer 606. Abstract configuration data 602 includes meta attributes that are attached to various settings stored at abstract configuration data 602. These meta attributes of abstract configuration data 602 are communicated to configuration manager 602.

Abstract configuration data 602 includes default configuration 610 which includes abstract (i.e., system independent) default configurations. Abstract configuration data 602 further includes configuration templates 612 that are usage-based templates that overwrite default settings according to the requirements of the specific usage. Configuration manager 604 reads configuration data acquired from abstract configuration data 602 as well as configuration data for the usage of attached usage context 608. The configuration data from usage context 608 and abstract configuration data 602 is communicated to configuration consumer 606. Stated differently, the configuration for the usage of the attached usage context 608 is returned at configuration consumer 606. The usage is determined and configuration templates 612 are configured and customized according to the determined usage (e.g., usage 1 template, usage 2 template . . . usage n template). Further, different usage contexts can be attached to the same configuration data (e.g., J2EE developer, Enterprise Portal, etc.) and communicated to configuration manager 604 via usage context 608.

Figure 7:
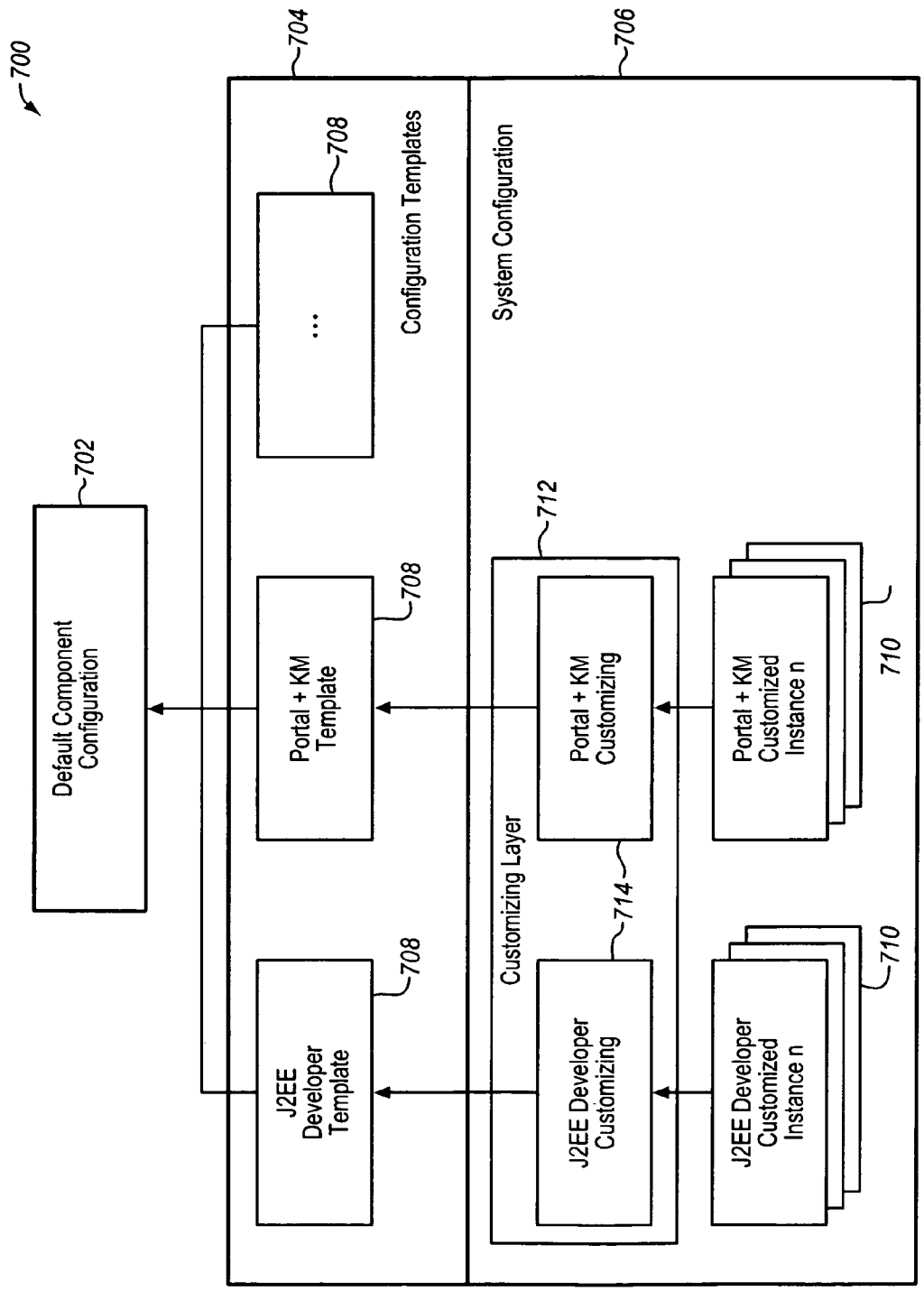
FIG. 7 illustrates an embodiment of a configuration structure.

FIG. 7 illustrates an embodiment of a configuration structure 700. Configuration structure 700 includes default configuration level 702, configuration templates level 704, and system configuration or customizing level 706. At template level 704, templates 708 can be changed via deployment (e.g., deploying new or update template versions, etc.). Various configuration tools may be used to change or modify templates 708 at system configuration or customization layer 706. This mechanism helps preserve the original template values as deployed into the system. Templates 708 may be modified using tools like web administrator (WebAdmin), configuration tool (ConfigTool), etc.

System configuration 706 contains configuration of the actual system having system instances 710 at an engine, such as a J2EE engine. For example, system configuration 706 includes configuration of instances 710 (e.g., J2EE developer customized instance, portal+KM customized instance, etc.) belonging to the system. An instance 710 may be assigned to a usage that is to be executed by the instance during runtime and is usage-based. Stated differently, configuration of instances 710 are derived from configuration templates 708 belonging to the corresponding usage. For example, instance configuration 710 of a J2EE developer customized instance at system configuration 706 is derived from the corresponding configuration template 708 of a J2EE developer at configuration templates 704 via the J2EE developer customizing at the customizing layer at system configuration 706.

In one embodiment, as each configuration template 708 at configuration templates 704 contains system dependencies in a dynamic way (e.g., via parameterized and computed settings), the need to overwrite these settings in the actual instance configuration is eliminated. The system-dependent configuration dynamically adapts itself to the actual system environment and thus, the engine runtime itself does not require any additional configuration. Furthermore, engine runtime and instances 710 at system configuration 706 are already functional without overwriting any settings inherited from configuration templates 708. Nevertheless, additional engine components (e.g. configuring landscape connectivity, etc.) may be customized at a place within system configuration 706 called customizing layer 712 where each customizing component corresponds to a configuration template 708.

The configuration changes at system configuration 706 may be visible across all instances 710 that are assigned to their corresponding configuration templates 708 at configuration templates 704. For example, in the illustrated embodiment, a change at the level of "Portal+KM Customizing" configuration applies to and is visible across all "Portal+KM Customizing Instances n" 710 within the cluster at system configuration 706 which corresponds to the "Portal+KM Template" 708 at configuration templates 704. However, in those cases in which the change is to be made to merely a particular instance 710, the configuration change may be made directly to that particular instance 710 at the instance level of system configuration 706 rather than making the change at the customizing layer level 712 or to templates 708.

In one embodiment, configuration templates 708 are created at an archive including a template software delivery archive. Each of the configuration templates 708 includes an Extensible Markup Language (XML) file. Configuration templates 708 may be created using one or more template creation tools. Templates 708 are deployed into the corresponding system via one or more deploy or deployment tools and customized via one or more configuration tools on top of a special JAVA API. Configuration templates 708 are usage-based, e.g., they are configured based on a specific usage as it relates to an instance 710. Configuration templates 708 are then integrated into configuration structure 700 at configuration templates level 704 via an integration tool, such as a template integration tool. The integration of configuration templates 708 into configuration structure 700 includes assigning of instances 710 to configuration templates 708 based on their usage as configuration templates 708 are usage-based templates. The deployment and activation of configuration templates 708 are further described below.

Figure 8:
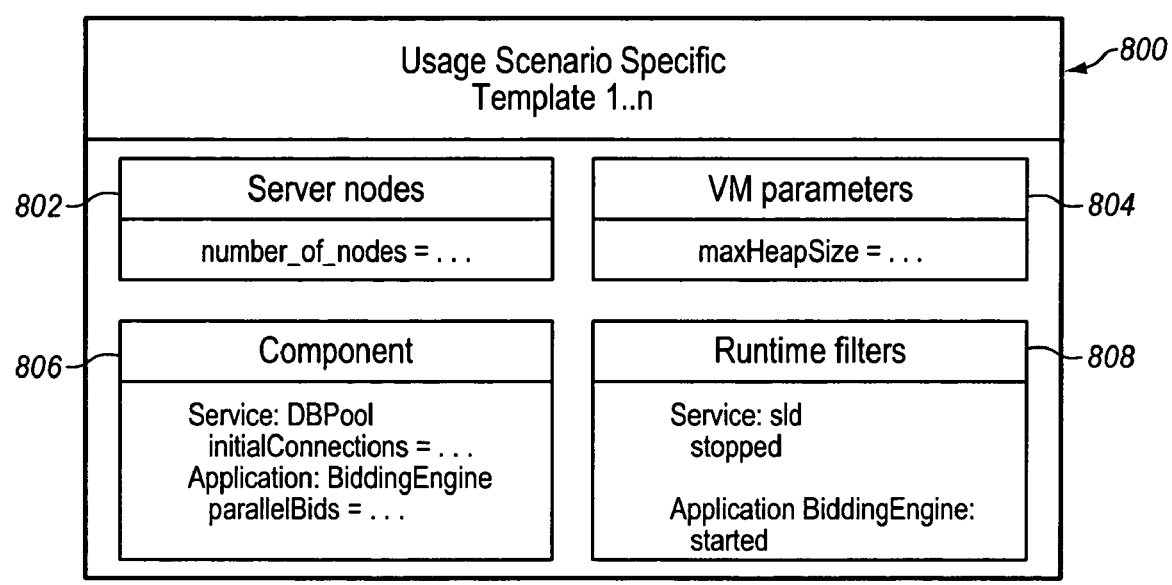
FIG. 8 illustrates an embodiment of a usage-based configuration template.

FIG. 8 illustrates an embodiment of a usage-based configuration template 800. In one embodiment, configuration template 800 includes an XML file. To deploy this file, the file may be packaged in a component archive (e.g., SDA). An example of such structure may include: <META-INF/MANIFEST.MF, META-INF/SAP_MANIFEST.MF, META-INF/SDA_DD.xml, template.xml>. Template 800 includes server nodes 802 indicating a number of server nodes per instance, VM parameters 804, modifications to default component configuration 806, and runtime filters 808 (e.g., which components are started and which ones are not started).

Server nodes 802 indicate a number of server nodes running per instance. The number of server nodes is optionally specified in the template tag. The number of server nodes is calculated based on the number of processors and the available memory. VM parameters 804 provides a flexible mechanism of VM settings, which can be used to specify (1) general parameters for VM types and platforms; (2) VM-vendor specific parameters for platforms (e.g., SUN, IBM, HP, etc.); and (3) VM vendor and platform-specific parameters. There may be an inheritance mechanism between these three layers. The more specific parameters may overwrite the more general ones. Thus, the vendor and platform specific parameters may overwrite the VM vendor-specific parameters for all platforms. System parameters and system information may also be referenced. For example, (1) the amount of memory and (2) the number of nodes per instance may be referenced to calculate the amount of memory per server node. Also, the "maxHeapSize" on some platform may be limited to a certain amount of memory.

To set VM parameters 804 to increase the ease of manipulating JAVA parameters, the VM parameters may be separated into three groups, such as (1) memory parameters, (2) system parameters, and (3) additional parameters. For example, memory parameters include a predetermined set of parameters. The names of memory parameters and their values may be specified. The specified value may be calculated out of the total memory for the instance and the number of nodes. The VM parameter names, however, may not be specified, but instead, the predefined name that is mapped to the correct name of each VM may be used. The name and value for system parameters are specified since the system parameters are divisible into name-value pairs. For additional parameters, names and values may be specified.

An adjustment of component parameters 806 may include adjusting the default configuration of applications, services, managers, etc. The default configurations that require merely a few usage-specific configurations may be provided; however, system specific values may not be specified. For system specific values, references to the parameters that are provided in the system profile and system information are used. The configuration of a component is specified inside the configuration section of the template. The configuration section includes applications, services, and managers, etc., while each of them can be specified multiple times and in any given order. Furthermore, a property tag may be used to modify a property. For example, the name and value attributes of the property are specified. The description attribute may explain why the value is set the way it is.

An application and service to be started and/or stopped may be specified. These runtime filters 808 are represented as start/stop rules. Each of the rules has the same structure and attributes. For the component name and the component provider, one can use "*" as wildcard, even in complex patterns such as "portal*xyz". The order in which runtime filters 808 are specified may be significant, as it may change the complete startup semantics. The evaluation mechanism is as follows: filter lists followed up through the configuration inheritance hierarchy are appended and evaluated from the "bottom to top" (e.g., the startup configuration at lower level overrides the one at a higher level). Also, a component matching a stop filter may be stopped, unless another component, referring the first one is set to be started by a subsequent filter rule.

Figure 9:
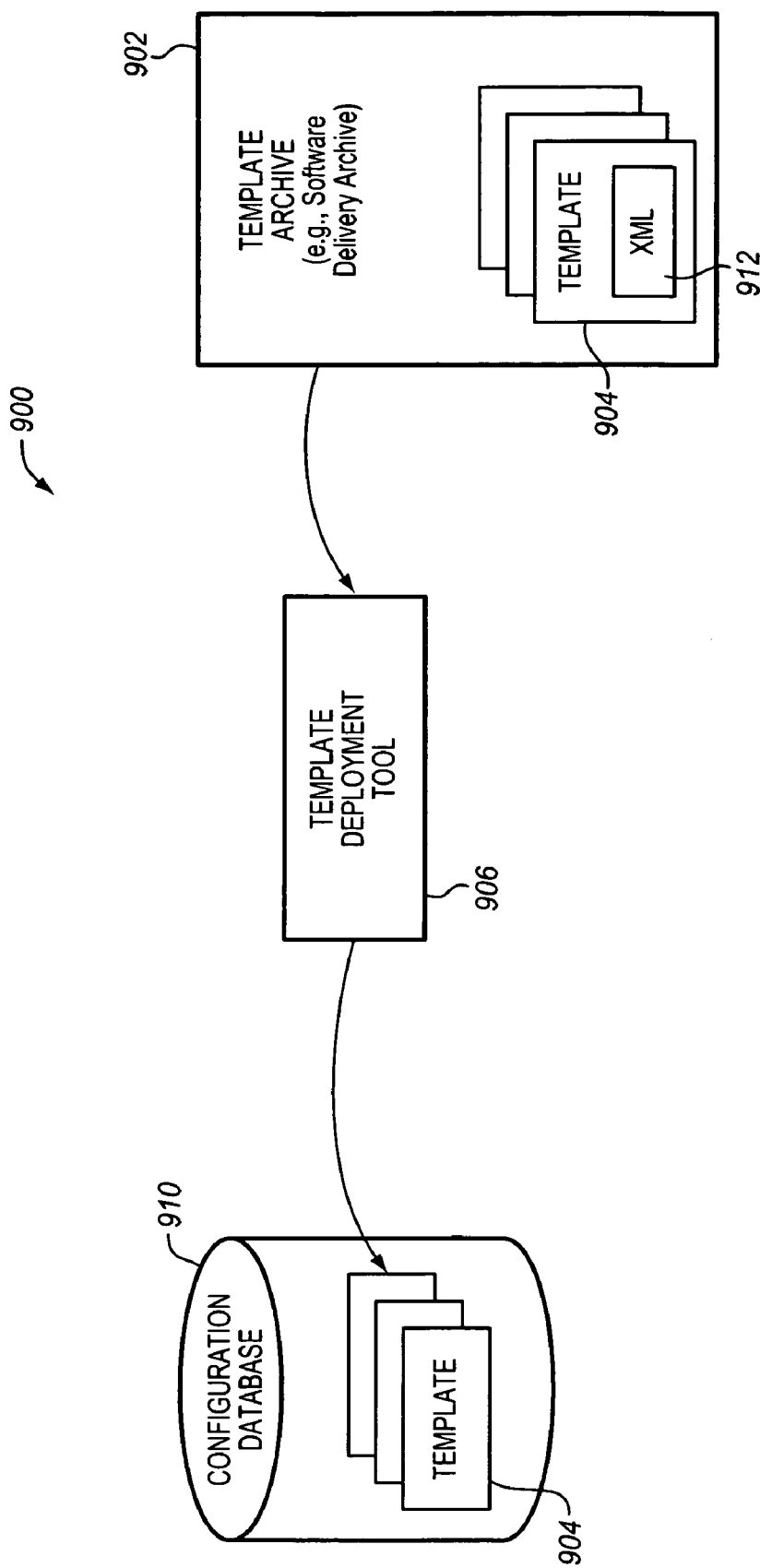
FIG. 9 illustrates an embodiment of a template deployment architecture.

FIG. 9 illustrates an embodiment of a template deployment architecture 900. In one embodiment, templates 904 including XML files 912 are provided at template SDA 902. Templates 904 are usage-specific, which means they are system-independent. In one embodiment, template deployment tool (deployment tool) 906 is used to deploy templates 904 from template SDA 902 to configuration database 910. Deployment tool 906 creates nodes to place templates 904 at configuration database 910 where templates 904 correspond to the nodes. Deployment tool 906 is aware of the structure of templates 904 both at template SDA 902 and at configuration database 910. For example, deployment tool 906 provides the mapping of XML files 912 (e.g., for end portal) contained within templates 904 to configuration database 910. This mapping mechanism provides a seamless deployment of templates 904 from template SDA 902 to configuration database 910.

Once template SDA 902 having templates 904 is created, templates 904 may be deployed like any other SDA content via deployment tool 906. For example, the following telnet command may be used: <telnet 5 (INSTANCE_NUMBER) 08 (e.g., telnet 56508), >add deploy, >deploy c:\zeroadmin\template.sda version_rule=all>. For merely changing the template.xml in template SDA 902, "version_rule=all" may be specified to force a redeployment. Also, since the server may be restarted, the redeployment also works for offline deployments. Furthermore, since no feedback is received if the deployment fails, a "DeployView plug-in" may be used as provided by SAP AG.

Figure 10:
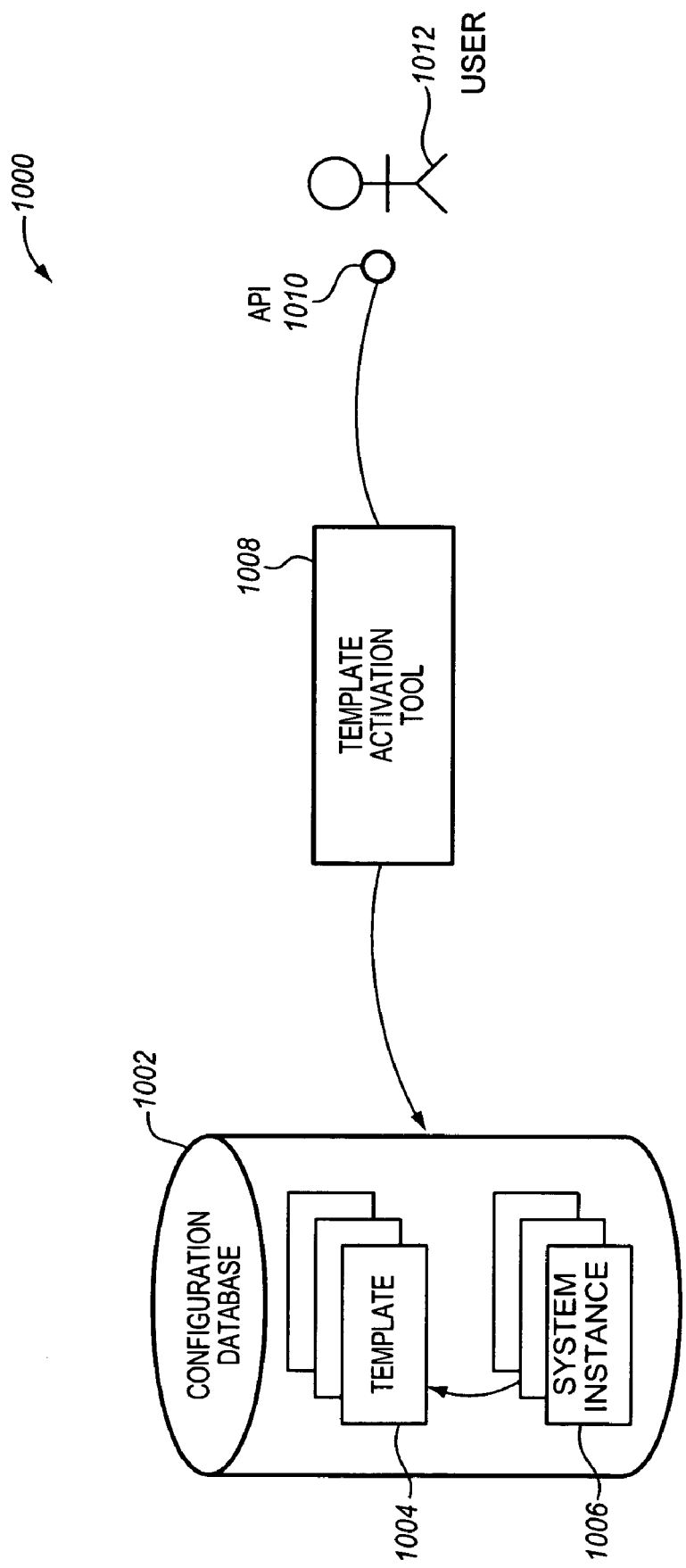
FIG. 10 illustrates an embodiment of a template activation architecture.

FIG. 10 illustrates an embodiment of a template activation architecture 1000. Once templates 1004 are deployed at configuration database 1002, templates 1004 are to be activated before they can be used. At configuration database 1002, templates 1004 are assigned system instances 1006 that are to be configured and customized. For the activation of templates 1004, template activation tool (activation tool) 1008 may be used. Activation tool 1008 contains information about the structure, inheritance, and representation of templates 1004 at configuration database 1004 and how to change and activate templates 1004. In one embodiment, activation tool 1008 activates templates 1004 and provides them to user 1012 via API 1010 so they can be accessed and used. User 1012 may then use activated templates 1004. In another embodiment, activation tool 1008 provides activation-ready templates 1004 to user 1012 via API 1010 for activation. User 1012 may then activate templates 1004 via activation tool 1008 and then use such templates 1004.

In one embodiment, the deployment of templates 1004, as described with reference to FIG. 9, may be performed at the time of installation, while the activation of templates 1004 may be performed at anytime. For example, the activation of templates 1004 includes changing the active templates 1004, which can be done anytime. Further, a tool (e.g., command line tool) may be provided for certain users (e.g., internal users) to help list all available templates 1004 from which, one or more templates 1004 may be selected for activation.

Figure 11:
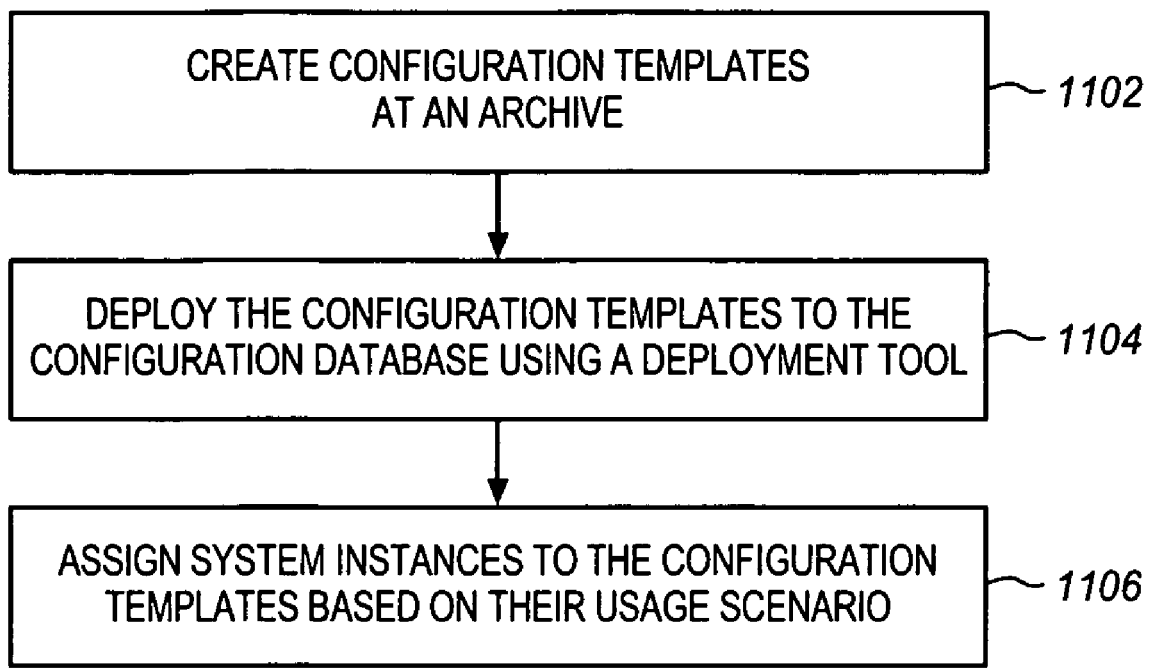
FIG. 11 illustrates an embodiment of a process for integrating configuration templates into a configuration structure.

FIG. 11 illustrates an embodiment of a process for integrating configuration templates into a configuration structure. At processing block 1102, one or more configuration templates are created at an archive (e.g., SDA) in accordance with the usage (e.g., end point usage) such that the configuration templates are usage-based and system-independent. Configuration templates are to be integrated into a configuration structure at an engine (e.g., J2EE engine) associated with one or more systems. A configuration template includes an XML file that contains a predefined instance configuration for specific usage case scenarios (e.g., portal+KM, minimal instance, J2EE developer, etc.) that is later associated or assigned to a corresponding system instance that is in communication with a system. In one embodiment, these configuration templates are system-independent such that the configuration information provided by the configuration templates is not system-dependent and that any system dependencies are configured via dynamic configuration. Such dynamic configuration includes parameterized settings, computed settings, value links, etc. Thus, a configuration template is system-independent and can be moved between various systems. Further, a configuration template is derived from default configuration and overwrites the settings according to the specific usage that is assigned to the template.

In one embodiment, a configuration template may contain (1) instance layouts (e.g., configurations relating to a number of server nodes running on the corresponding instance), (2) VM configurations containing VM or JVM memory settings and parameters, and (3) kernel configurations containing system-independent properties of the manager components of an engine (e.g., J2EE engine), (4) service settings containing system-independent service properties of each service component, (5) application configurations having system-independent application configurations of each application which is part of the installation, and (6) runtime filter configurations including configurations for enabling and disabling components according to the assigned usage.

At processing block 1104, configuration templates are then deployed at the configuration database. In one embodiment, the deployment of configuration templates is performed at the time of installation. Furthermore, the deployment of templates includes the mapping of the templates residing at the archive to the configuration database. At the configuration database, each system instance is assigned to a configuration template based on the usage of the corresponding instance as the configuration templates are activated at processing block 1106. It is contemplated that the templates described here are used as examples of usage templates and that the actual templates are not limited to the examples described herein.

Figure 12:
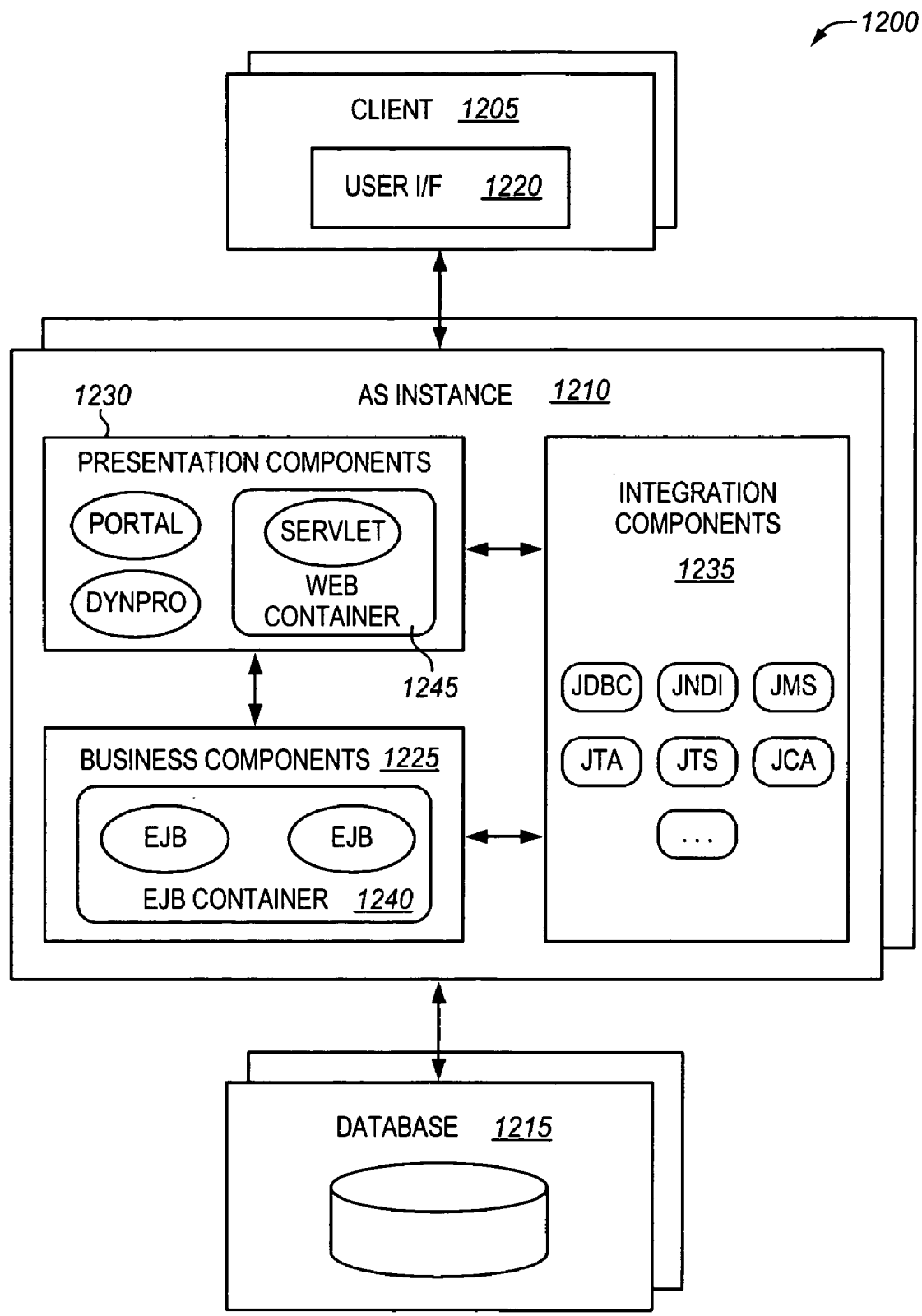
FIG. 12 illustrates an enterprise system for implementing one or more embodiments of the present invention.

FIG. 12 illustrates an enterprise system 1200 for implementing one or more embodiments of the present invention. Enterprise system 1200 is a multi-tier architecture implemented using a variety of different technologies at each sublayer, including those based on the J2EE standard (e.g., J2EE Specification, Version 1.4), the Microsoft .NET standard, the Advanced Business Application Programming (ABAP) standard developed by SAP AG, and the like.

The illustrated embodiment of enterprise system 1200 includes one or more clients 1205 communicatively coupled to one or more application server (AS) instances 1210, which are in turn communicatively coupled to one or more database 1215. User interface 1220 provides a GUI to enable users of clients 1205 to interact with databases 1215 (e.g., submit queries, input data, etc.) through AS instances 1210.

AS instances 1210 may each include business components 1225, presentation components 1230, and integration components 1235, which together form subcomponents of an AS (e.g., WebAS by SAP AG). Business components 1225 provide the business logic of AS instance 1210, enabling complex business processes to be implemented. In a J2EE environment, business components 1225 may include one or more Enterprise JavaBean (EJB) containers 1240 each including one or more EJBs. EJBs are JAVA-based software modules that contain the actual business logic, while EJB container 1240 encapsulates the EJBs in a JAVA-based runtime environment that provides a host of common interfaces and services to the EJBs.

Presentation components 1230 describe the specific manner in which the results of business components 1225 are formatted for display on user interface 1220. The results may be formatted with aid of a web container 1245 that supports both servlets and JavaServer Pages (JSPs). The servlets provide server-side processing to generate the GUI and the JSPs are extensions of the JAVA servlet technology for providing dynamic content within the GUI. For example, in WebAS, the servlets may include SAP Enterprise Portal, which provides a uniform and personalized access to various different back-end systems via a browser, Web Dynpro which uses JSPs to provide a development and runtime environment for Web applications, or other presentation logic.

Integration components 1235 enable access to business functionalities from external resources. This is done using various services, connectors (middleware), communication protocols, and support for general data exchange formats (e.g., extensible markup language). For example, integration components 1235 may contain support for the following services: JAVA Database Connectivity (JDBC), API, the JAVA Naming and Directory Interface ("JNDI"), JMS, the JAVA Transaction Service (JTS), the JAVA Transaction API (JTA), the J2EE Connector Architecture (JCA), and the like.

A template configuration tool may provide configuration of templates corresponding to any or all of the components of enterprise system 1200 described above, including the business, presentation, and integration components. Furthermore, template configuration tool may be used to configure the underlying engines that operate these components. These underlying engines may be various types of JVMs, such as the J2EE engine. In one embodiments, template configuration tool may be used to configure applications within clients 1205, various components of database 1215, a dispatcher for distributing work requests between AS instances 1210 or an internal dispatcher within each AS instance 1210, a message server, and the like.

One or more modules within or associated with the architectures and methodologies discussed above may include hardware, software, and/or a combination of these. In a case where a module includes software, the software data, instructions, and/or configuration may be provided via an article of manufacture by a machine/electronic device/hardware. An article of manufacture may include a machine accessible/readable medium having content to provide instructions, data, etc. The content may result in an electronic device, for example, a filer, a disk, or a disk controller as described herein, performing various operations or executions described. A machine accessible medium includes any mechanism that provides (i.e., stores and/or transmits) information/content in a form accessible by a machine (e.g., computing device, electronic device, electronic system/subsystem, etc.). For example, a machine accessible medium includes recordable/non-recordable media (e.g., ROM, RAM, magnetic disk storage media, optical storage media, flash memory devices, etc.), as well as electrical, optical, acoustical or other form of propagated signals (e.g., carrier waves, infrared signals, digital signals, etc.), etc. The machine accessible medium may further include an electronic device having code loaded on a storage that may be executed when the electronic device is in operation. Thus, delivering an electronic device with such code may be understood as providing the article of manufacture with such content described above. Furthermore, storing code on a database or other memory location and offering the code for download over a communication medium via a propagated signal may be understood as providing the article of manufacture with such content described above.

The architectures and methodologies discussed herein may be implemented with various types of computing systems such as an application server that includes a J2EE server that supports EJB components and EJB containers (at the business layer) and/or Servlets and JSP (at the presentation layer). Of course, other embodiments may be implemented in the context of various different software platforms including, by way of example, Microsoft® .NET, Windows®/NT, Microsoft Transaction Server (MTS), the ABAP platforms developed by SAP AG and comparable platforms.

Throughout the description, for the purposes of explanation, numerous specific details are set forth to provide a thorough understanding of the embodiments of the present invention. It will be apparent, however, to one skilled in the art that the present invention may be practiced without some of these specific details. In other instances, well-known structures and devices are shown in block diagram form to avoid obscuring the underlying principles of the present invention.

Numerous specific details such as logic implementations, opcodes, resource partitioning, resource sharing, and resource duplication implementations, types and interrelationships of system components, and logic partitioning/integration choices are described herein to provide a more thorough understanding of various embodiments of the present invention. It will be appreciated, however, to one skilled in the art that the embodiments of the present invention may be practiced without such specific details, based on the disclosure provided. In other instances, control structures, gate level circuits and full software instruction sequences have not been shown in detail in order not to obscure the invention. Those of ordinary skill in the art, with the included descriptions, will be able to implement appropriate functionality without undue experimentation.

As used herein, references to one or more "embodiments" are understood as describing a particular feature, structure, or characteristic included in at least one implementation of the invention. Thus, phrases such as "in one embodiment" or "in an alternate embodiment" appearing herein describe various embodiments and implementations of the invention, and do not necessarily all refer to the same embodiment. However, they are also not necessarily mutually exclusive. Descriptions of certain details and implementations follow, including a description of the figures, which may depict some or all of the embodiments described below, as well as discussing other potential embodiments or implementations of the inventive concepts presented herein.

The processes explained above are described in terms of computer software and hardware. The techniques described may constitute machine-executable instructions embodied within a machine (e.g., computer) readable medium, that when executed by a machine will cause the machine to perform the operations described. Additionally, the processes may be embodied within hardware, such as an application specific integrated circuit (ASIC) or the like. The order in which some or all of the process blocks appear in the processes should not be deemed limiting. Rather, one of ordinary skill in the art having the benefit of the disclosure will understand that some of the process blocks may be executed in a variety of orders not illustrated.

Similarly, it should be appreciated that in the foregoing description of exemplary embodiments of the invention, various features of the invention are sometimes grouped together in a single embodiment, figure, or description thereof for the purpose of streamlining the disclosure aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

In addition to what is described herein, various modifications may be made to the disclosed embodiments and implementations of the invention without departing from their scope. Therefore, the illustrations and examples herein should be construed in an illustrative, and not a restrictive sense. The scope of the invention should be measured solely by reference to the claims that follow.

What is claimed is:

1. A method comprising:

generating a usage-based configuration template based on usage-based configuration information relating to a plurality of computer systems to dynamically adapt to usage settings of each of the plurality of computer systems, the usage-based configuration template being independent of a particular configuration setting of the plurality of computer systems other than said usage settings;

integrating a default configuration template with the usage-based configuration template to generate a dynamic configuration template, the default configuration template being default configuration settings of a primary computer system of the plurality of computer systems; and employing the dynamic configuration template to dynamically adapt to usage settings of the primary computer system and maintain compatibility with the default configuration settings of the primary computer system.

2. The method of claim 1, further comprising:

moving the usage-based configuration template from the primary computer system to one or more secondary computer systems of the plurality of computer systems, the usage-based configuration template to dynamically adapt to usage settings of the one or more secondary computer systems.

3. The method of claim 1, wherein the usage-based configuration information includes information relating to one or more of a virtual machine configuration, a kernel configuration, a service settings configuration, an application configuration, and a runtime-filter configuration.

4. A system comprising:

a server computer system coupled with a database having default configuration information relating to default configuration settings associated with a primary computer system of a plurality of computer systems coupled with the server computer system, the server computer system having an application server, the application server to generate a usage-based configuration template based on usage-based configuration information relating to the plurality of computer systems to dynamically adapt to usage settings of each of the plurality of computer systems, the usage-based configuration template being independent of a particular configuration setting of the plurality of computer systems other than said usage settings;

integrate a default configuration template with the usage configuration template to generate a dynamic configuration template, the default configuration template being the default configuration settings of the primary computer system; and employ the dynamic configuration template to dynamically adapt to usage settings of the primary computer system and maintain compatibility with the default configuration settings of the primary computer system.

5. The system of claim 4, wherein the application server is further modified to:

move the usage-based configuration template from the primary computer system to one or more secondary computer systems of the plurality of computer systems, the usage-based configuration template to dynamically adapt to usage settings of the one or more secondary computer systems.

6. The system of claim 4, wherein the usage-based configuration information includes information relating to one or more of a virtual machine configuration, a kernel configuration, a service settings configuration, an application configuration, and a runtime-filter configuration.

7. A machine-readable storage medium comprising instructions which, when executed, cause a machine to:

generate a create usage-based configuration template based on usage-based configuration information relating to a plurality of computer systems to dynamically adapt to usage settings of each of the plurality of computer systems, the usage-based configuration template being independent of a particular configuration setting of the plurality of computer systems other than said usage settings;

integrate a default configuration template with the usage configuration template to generate a dynamic configuration template, the default configuration template being based on default configuration settings of a primary computer system of the plurality of computer systems; and employ the dynamic configuration template to dynamically adapt to usage settings of the primary computer system and maintain compatibility with the default configuration settings of the primary computer system.

8. The machine-readable storage medium of claim 7, wherein the instructions which, when executed machine, further cause the machine to:

move the usage-based configuration template from the primary computer system to one or more secondary computer systems of the plurality of computer systems, the usage-based configuration template to dynamically adapt to usage settings of the one or more secondary computer systems.

9. The machine-readable storage medium of claim 7, wherein the usage-based configuration information includes information relate to one or more of a virtual machine configuration, a kernel configuration, a service settings configuration, an application configuration, and a runtime-filter configuration.

* * * * *